Sept. 29, 1925.
T. N. ULEVOG
1,555,171
VEHICLE STEERING AND TOWING DEVICE
Filed July 2, 1924  3 Sheets-Sheet 2
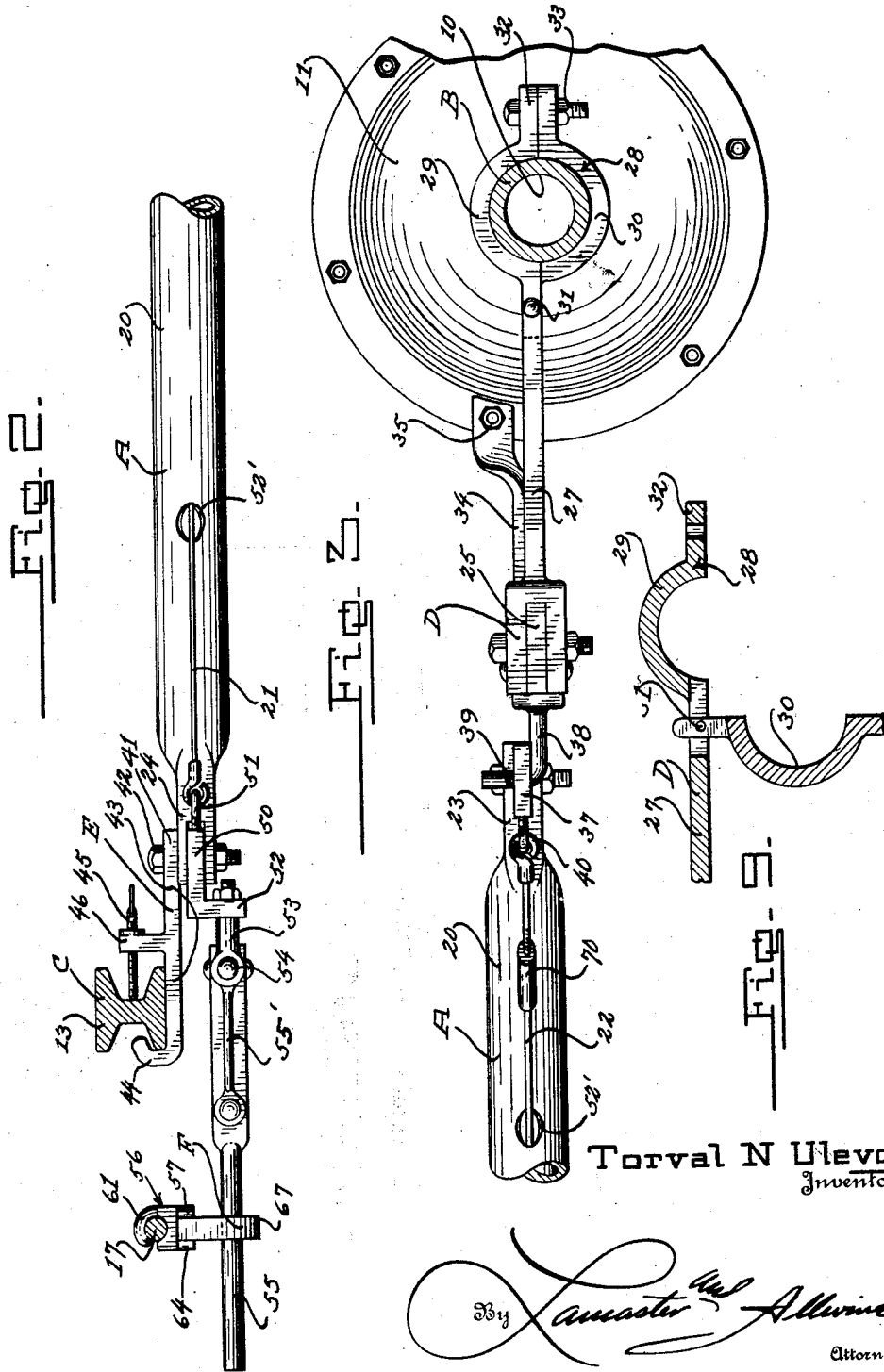
Torval N Ulevog
Inventor
By Lamaster and Allwine
Attorney

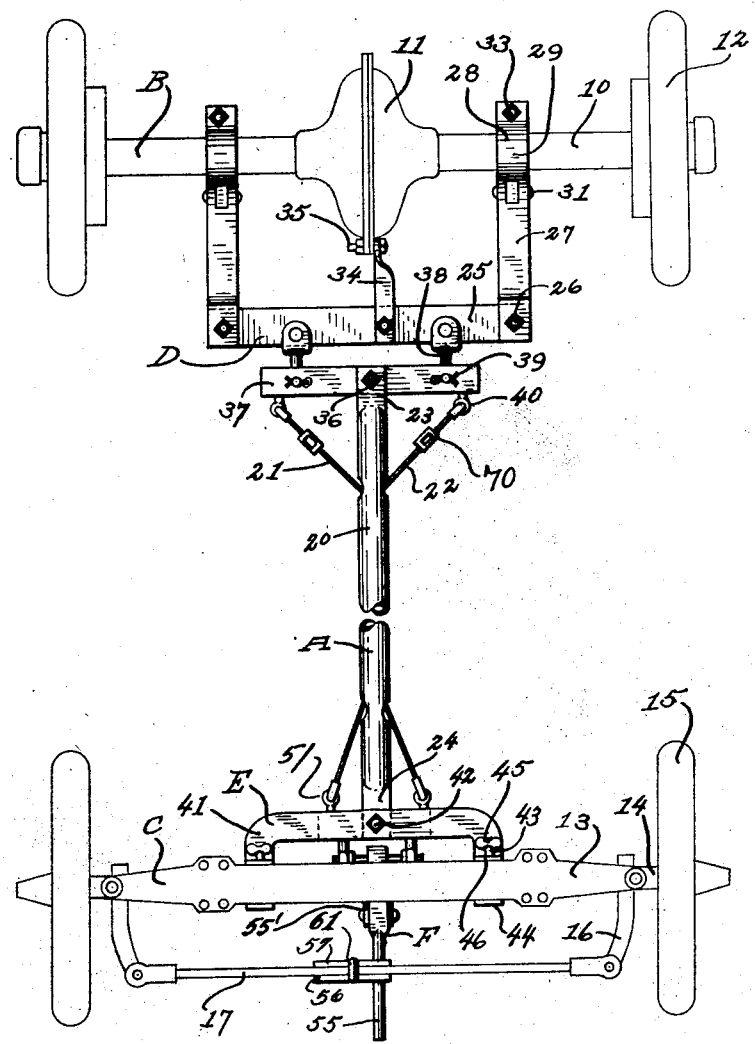

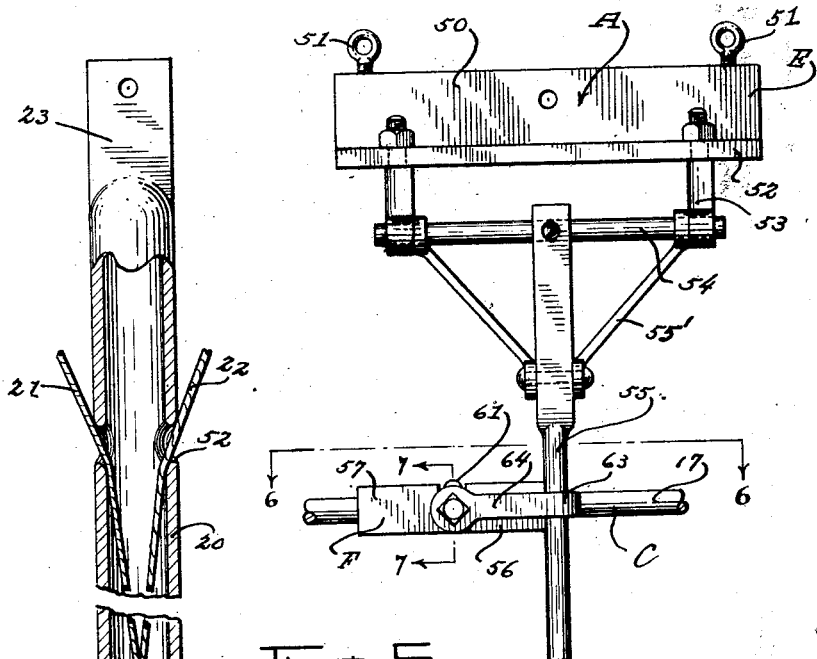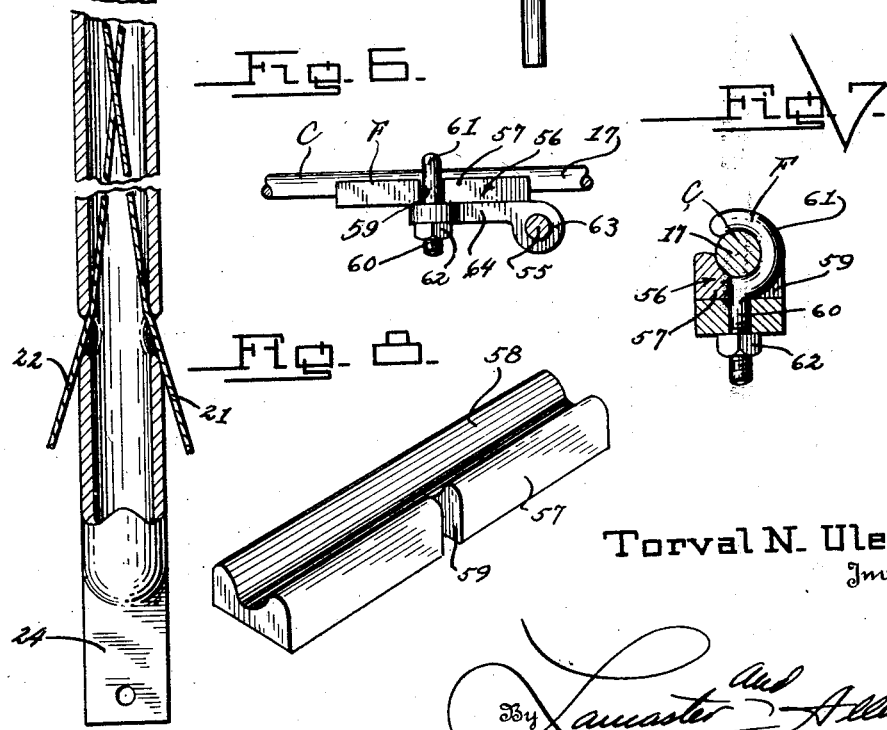

Patented Sept. 29, 1925.

1,555,171

UNITED STATES PATENT OFFICE.

TORVAL N. ULEVOG, OF MOOSOMIN, SASKATCHEWAN, CANADA, ASSIGNOR OF TWO-NINTHS TO ROSS H. MARTYN, TWO-NINTHS TO PETER McFADDEN, AND TWO-NINTHS TO G. D. FINLAYSON, ALL OF REGINA, SASKATCHEWAN, CANADA.

VEHICLE STEERING AND TOWING DEVICE.

Application filed July 2, 1924. Serial No. 723,803.

*To all whom it may concern:*

Be it known that I, TORVAL N. ULEVOG, a subject of the King of Great Britain, residing at Moosomin, in the Province of Saskatchewan and Dominion of Canada, have invented certain new and useful Improvements in Vehicle Steering and Towing Devices, of which the following is a specification.

This invention relates to vehicle attachments and the primary object of the invention is the provision of a novel device for coupling vehicles together, so that a vehicle can be readily towed, the device being particularly adaptable for use in towing disabled automobiles and for connecting trailers and the like to automobiles and tractors.

Further objects of the invention are to provide, first, means whereby the vehicles will be always held in spaced relation irrespective of the speed of the towing vehicle or whether the towing vehicle and the vehicle being towed are going down or up hill; and second, means for permitting the steering of the vehicle being towed by the towing vehicle, thereby eliminating the necessity of providing a man in the vehicle being towed for steering the same.

Another object of the invention is the provision of novel means for connecting the towing device with the towing vehicle and the vehicle being towed, so that two vehicles can be connected together in an easy and expeditious manner.

With these and other objects in view, the invention consists in the novel construction, arrangement and formation of parts, as will be hereinafter more specifically described, claimed and illustrated in the accompanying drawings, forming a part of this specification, in which drawings:

Figure 1 is a plan view of the improved towing device, showing the same applied to the front and rear axle portions of two different vehicles.

Figure 2 is an enlarged fragmentary side elevation of the rear portion of the towing device showing the same applied to the front axle and connecting steering rod of a vehicle to be towed.

Figure 3 is an enlarged side elevation of the forward portion of the towing device showing the same connected to the rear axle of a driving or towing vehicle.

Figure 4 is an enlarged plan view of the steering portion of an improved towing device, showing the same connected to the steering connecting rod of a vehicle being towed.

Figure 5 is a fragmentary longitudinal section through the towing pole forming a part of the improved towing device.

Figure 6 is a section taken on the line 6—6 of Figure 4, illustrating the clamp for connecting the connecting or steering cross rod of a vehicle being towed to the steering pin or arm of the towing device.

Figure 7 is an enlarged transverse section through the clamp, taken on the line 7—7 of Figure 4.

Figure 8 is an enlarged detail perspective view of a portion of the clamp arranged to receive the steering connecting cross rod of a vehicle being towed, and Figure 9 is an enlarged section through one of the clamps utilized for connecting the draw bar to the towing vehicle.

Referring to the drawings in detail, wherein similar reference characters designate corresponding parts throughout the several views, the letter A generally indicates the improved towing device; B, the towing or driving vehicle; and C, the vehicle being towed or drawn.

Only fragments of the towing vehicle and the vehicle being towed have been shown in the drawings, and as illustrated, the towing vehicle B includes the rear axle housing 10, the differential housing 11, and the rear drive wheels 12.

The vehicle to be towed or drawn includes a front axle 13 which is of the usual I-beam construction, the stub steering axles 14 for supporting the steering wheels 15, the steering arms 16 connected to the stub axles 14 and the connecting or steering cross rod 17.

The improved towing device A comprises a rigid towing pole 20 which is preferably of hollow cylindrical construction for the reception of the steering cables 21 and 22, which will be hereinafter more fully described. The terminals of the rigid steering or connecting pole 20 are flattened and bifurcated to provide the pairs of attaching ears 23 and 24.

The connecting pole 20 is provided with a means D for connecting the same with a towing vehicle and the means E for connecting the same with the vehicle being drawn. The means F is also provided for connecting the steering cables 21 and 22 with the connecting or cross rod 17 of the vehicle being towed.

The connecting means D comprises a draw bar 25, which is disposed in parallel relation to the rear axle housing 10 of the towing vehicle B and connected thereto in any preferred manner. As shown, the terminals of the draw bar 25 have bolted thereto as at 26, the forwardly extending arms 27. These arms 27 may be provided with suitable clamps 28 for engaging the rear axle housing 10. By way of example, the clamps 28 have been shown to consist of rigid semi-circular members 29, which are formed directly upon the arms 27, and swinging semi-circular members 30, which are hingedly connected as at 31 to the arms 27. Each of the semi-circular members 29 and 30 are provided with abutting ears 32, which are adjustably connected together by means of suitable nuts and bolts 33. The central portion of the draw bar 25 may also have bolted thereto a strap 34, which may be secured to the differential housing 11 by a suitable bolt 35. This strap 35 eliminates any sliding movement of the clamps 28 on the rear axle housing 10. The extreme forward end of the towing pole 20 has pivotally connected thereto by means of a pivot bolt 36, a cross steering bar 37. This bar 37 is spaced intermediate the front pair of ears 23 formed on the pole 20. The draw bar 25, on each side of the transverse center thereof, has secured thereto hooks 38, which are adapted to be received in openings formed in the steering bar 37 and the terminals of the hooks 38 may receive removable cotter pins 39, in order to prevent displacement of the steering bar 37 from off the hooks after the steering pole 20 is placed in position. The rear edge of the steering bar 37, on opposite sides of the pole 20, has secured thereto suitable eyes 40, to which can be secured the steering cables 21 and 22.

The means E provided for connecting the towing pole 20 to the vehicle C includes an attaching bar 41 substantially U-shaped in plan, and this bar is connected intermediate its ends to the uppermost ear of a pair of ears 24, by means of a bolt 42. The terminals of the U-shaped bar 41 are provided with suitable clamps 43 for engaging the front axle 13 of the vehicle C and each of these clamps 43 includes a hook 44 for engaging the rear surface of the axle and an adjusting screw 45 for engaging the front surface of the axle. The adjusting screws 45 are carried by upstanding ears 46 formed on the arms of the U-shaped attaching bar 41, and these ears 46 are disposed in spaced relation to the hooks 44. It is obvious that by adjusting the screws 45, the attaching member 41 will be clamped firmly in position on the front axle 13.

The means F utilized for connecting the steering cables 21 and 22 with the cross rod 17 of the steering apparatus of the vehicle C includes a steering cross bar 50, which may be conveniently disposed intermediate the pairs of ears 24 formed on the rear end of the pole 20 and rockably held in position by means of the bolt 42. The forward edge of this bar 50 has secured thereto on opposite sides of the transverse center thereof, eyes 51, to which are secured the steering cables 21 and 22. As stated, these steering cables extend through the pole 20 and are threaded through suitable openings 52' formed therein adjacent to the opposite ends thereof. These cables are crossed intermediate their ends as clearly shown in Figure 5 of the drawings. The rear edge of the steering bar 50 is provided with a right-angularly disposed flange 52 and this flange 52 has bolted or otherwise secured thereto rearwardly extending eyes 53 for hingedly supporting rod 54, to which is bolted or otherwise secured the steering arm or pin 55. This steering arm or pin 55 extends rearwardly of the front axle 13 and is connected to the cross rod 17 by a clamp 56 which will be described. If desired, suitable braces 55' may be connected to the opposite sides of the steering arm or pin 55 and mounted upon the pivot or hinged rod 54.

The clamp 56 comprises a member 57, having its upper face grooved as at 58 for the reception of the rod 17, and one edge of the member 57 is provided with a slot 59, in which is adapted to be positioned the shank portion 60 of a hook 61. This hook 61 is adapted to extend about the cross rod 17 and to firmly hold the same in the grooved surface 58 of the member 57. The shank portion 60 is provided with threads and a suitable adjusting nut 62 is mounted thereon for clamping the hook 61 in place. A sleeve 63 is provided for slidably receiving the steering arm or pin 55, and this sleeve 63 is formed on an arm 64 which is mounted upon the shank 60 of the hook 61. It is obvious that, by adjusting the nut 62, not only will the hook 61 be forced into tight clamping engagement with the rod 17, but that the sleeve 63 will also be connected therewith.

In operation of the improved device, the clamping means D is secured to the rear axle housing 10 of the towing vehicle B, and the steering cross bar 37 is placed upon the hooks 38, after which the connecting member 41 is clamped to the axle 13 of the vehicle to be drawn. After the member 41 has been clamped in position the clamp 56 is arranged in place for connecting the steering arm or pin 55 to the cross rod 17 and it is obvious that as the steering arm or cross rod swings in a vertical plane, that the same can be readily raised or lowered to engage different types of steering rods which may be positioned at varying distances in relation to the front axle 13.

Now, it is obvious that when the towing vehicle starts to move, the vehicle C will be pulled therewith, owing to the towing pole 20, which will always maintain the two vehicles in the same spaced relation. When the towing vehicle turns a corner, the front steering bar 37 will be swung on the pivot pin 36, which will actuate the steering cables 21 and 22, and consequently swing the rear steering bar 50 and swing the steering arm or pin 55. Now, owing to the connection of the steering pin or arm 55 with the cross rod 17, the rod will be moved therewith, thus turning the wheels 15, so that the vehicle being drawn will track in relation to the towing vehicle. By this construction, an operator for the vehicle being drawn is not necessary.

If so desired, suitable turn buckles 70 can be incorporated in the cables 21 and 22, so as to take up any slack which may occur therein.

While the towing device may be used for coupling any type of vehicles together, the same is particularly adapted for use in towing disabled cars, and the connecting means D can be permanently secured on the car B, if the same is to be used regularly as a repair car.

Changes in details may be made without departing from the spirit or scope of this invention; but,

I claim:

1. In a towing device, the combination of a towing pole, a steering bar pivotally secured to the forward end of the towing bar, means connecting front steering bar with the rear axle housing of a towing vehicle, means securing the rear end of the towing bar with the front axle of a vehicle to be towed, a rear steering bar pivotally secured to the rear end of the towing pole, flexible cross cables connecting the front and rear cross bars together, and means connecting the rear steering bar with the connecting cross rod of a steering bar of the vehicle to be towed.

2. In a towing device, the combination of a hollow tow pole, front and rear pivoted steering cross bars carried by the pole, means for detachably connecting the front steering cross bar with the towing vehicle, means connecting the rear end of the tow bar with a vehicle to be towed, a rearwardly extending steering arm hingedly associated with the rear steering bar carried by the tow pole, and means slidably connecting the steering arm with the cross rod of a steering gear of the vehicle to be towed.

3. In a towing device, the combination of a tubular towing pole having openings formed therein adjacent to its opposite ends, front and rear steering cross rods pivotally connected to the tow pole, cross flexible cables connected to the terminals of the steering cross rods, the cables being disposed in the tubular pole and threaded through the openings formed therein, a bracket for detachably receiving the rear axle housing of a towing vehicle, hooks carried by the bracket for detachably receiving the front steering cross bar, a rear connecting bracket for receiving the front axle of a vehicle to be towed, means connecting the rear end of the towing pole with the last mentioned bracket, and means carried by the rear steering cross bar for engaging the cross rod of the steering gear of the vehicle to be towed.

4. In a towing device, the combination of a front attaching bracket including a cross bar, forwardly extending arms carried by the cross bar, clamps carried by the forward ends of the arms for engagement with the rear axle housing of a towing vehicle, a rear connecting bracket including a U-shaped body, clamps carried by the terminals of the body for engaging the front axle of a vehicle to be towed, a rigid towing pole, means connecting the rear end of the towing pole to the rear connecting bracket, front and rear steering cross bars pivotally carried by the towing pole, rearwardly extending hooks carried by the draw bar of the front connecting bracket, the front steering cross bar having openings formed therein for detachably receiving said hooks, crossed flexible cables connecting the front and rear steering cross bars together, a hinge pin carried by the rear steering cross bar, a rearwardly extending steering arm mounted upon said hinge pin, a sleeve slidably receiving the steering arm, and a clamp carried by the sleeve for detachably engaging the cross steering rod of the steering gear of a vehicle to be towed.

5. In a towing device, the combination of a towing pole, a front steering bar pivotally connected at the forward end of said pole, means connecting said bar to the rear end of the towing vehicle in parallel relation to the rear axle thereof, means pivotally connecting the rear end of said pole to the front end portion of the vehicle being towed, a rear steering bar pivotally connected at the rear end of said pole and normally parallel to said front steering bar and at right angles to said pole when the vehicles are traveling in a straight line, means associated with said pole and operatively connected to said front and rear steering bars whereby swinging movement of said pole out of normal position with respect to said front steering bar will actuate said rear steering bar to corresponding angular relation to said pole with opposite ends of the front and rear steering bars at one side of the pole approaching one another, and opposite ends of said bars at the other side of the pole receding from one another, and means connecting the rear steering bar with the connecting cross rod of steering mechanism of the vehicle to be towed, whereby the towed vehicle will track with the towing vehicle.

TORVAL N. ULEVOG.